(12) United States Patent
Korpi et al.

(10) Patent No.: US 12,231,240 B2
(45) Date of Patent: *Feb. 18, 2025

(54) APPARATUS, METHOD AND SW FOR HARQ CONTROL

(71) Applicant: NOKIA TECHNOLOGIES OY, Espoo (FI)

(72) Inventors: Dani Korpi, Espoo (FI); Leo Kärkkäinen, Espoo (FI); Mikko Honkala, Espoo (FI); Janne Huttunen, Espoo (FI); Mikko Uusitalo, Espoo (FI)

(73) Assignee: Nokia Technologies Oy, Espoo (FI)

( * ) Notice: Subject to any disclaimer, the term of this patent is extended or adjusted under 35 U.S.C. 154(b) by 541 days.

This patent is subject to a terminal disclaimer.

(21) Appl. No.: 17/597,326

(22) PCT Filed: Jul. 4, 2019

(86) PCT No.: PCT/EP2019/067937
§ 371 (c)(1),
(2) Date: Jan. 3, 2022

(87) PCT Pub. No.: WO2021/001041
PCT Pub. Date: Jan. 7, 2021

(65) Prior Publication Data
US 2022/0329359 A1    Oct. 13, 2022

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1854* (2013.01); *H04L 1/1864* (2013.01);
(Continued)

(58) Field of Classification Search
None
See application file for complete search history.

(56) References Cited

U.S. PATENT DOCUMENTS

| 2019/0373588 A1* | 12/2019 | Bae | H04L 5/0044 |
| 2020/0083989 A1* | 3/2020 | Goktepe | H04L 1/1816 |
| 2021/0119754 A1* | 4/2021 | Tang | H04L 1/0016 |

FOREIGN PATENT DOCUMENTS

EP    2627137 A1    8/2013

OTHER PUBLICATIONS

European Office Action for Application No. 19737061.2, mailed on Feb. 28, 2023, 5 pages.
(Continued)

*Primary Examiner* — Christine T Duong
(74) *Attorney, Agent, or Firm* — Barta Jones, PLLC

(57) ABSTRACT

An apparatus, method and SW for HARQ control are disclosed. The method includes: analyzing (514) a beginning part of a data packet received on a specific frequency band and in a scheduled slot between a user apparatus and a radio access network to predict a success of decoding the data packet after received in full; and controlling (516) a hybrid automatic repeat request procedure associated with the data packet based on the predicted success using the specific frequency band and the scheduled slot for full-duplex inband signaling.

16 Claims, 12 Drawing Sheets

(51) Int. Cl.
*H04L 1/1867* (2023.01)
*H04W 72/0453* (2023.01)
*H04W 72/54* (2023.01)

(52) U.S. Cl.
CPC ....... *H04L 1/1896* (2013.01); *H04W 72/0453* (2013.01); *H04W 72/54* (2023.01)

(56) References Cited

OTHER PUBLICATIONS

International Search Report and Written Opinion for International Application No. PCT/EP2019/067937, mailed on Mar. 30, 2020, 13 pages.
3GPP TSG-RAN WG1#87; R1-1612249; "Early Hybrid ARQ Feedback for the 5G New Radio", Agenda Item: 7.1.4.4; Source: Nokia, Alcatel-Lucent Shanghai Bell; Reno, Nevada, USA; Nov. 14-18, 2016; 7 pages.

* cited by examiner

APPARATUS, METHOD AND SW FOR HARQ CONTROL

CROSS-REFERENCE TO RELATED APPLICATIONS

This application is a national stage entry of International Application No. PCT/EP2019/067937, filed Jul. 4, 2019, entitled "APPARATUS, METHOD AND SW FOR HARQ CONTROL" which is hereby incorporated by reference in its entirety.

FIELD

Various embodiments relate to control of HARQ (hybrid automatic repeat request).

BACKGROUND

HARQ procedure causes latency in a cellular radio network. This is because the receiver of the data packet must notify the transmitter, by sending a positive acknowledgement (ACK) if the receiver successfully decoded the data packet, or by sending a negative acknowledgement (NACK) if the receiver was not able to decode the data packet.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1 illustrates an embodiment of a general architecture of a cellular radio system;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

In the following, different embodiments will be described using, as an example of an access architecture to which the embodiments may be applied, a radio access architecture based on long term evolution advanced (LTE Advanced, LTE-A) or new radio (NR, 5G), or future cellular technologies (e.g. 6G or the like) without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
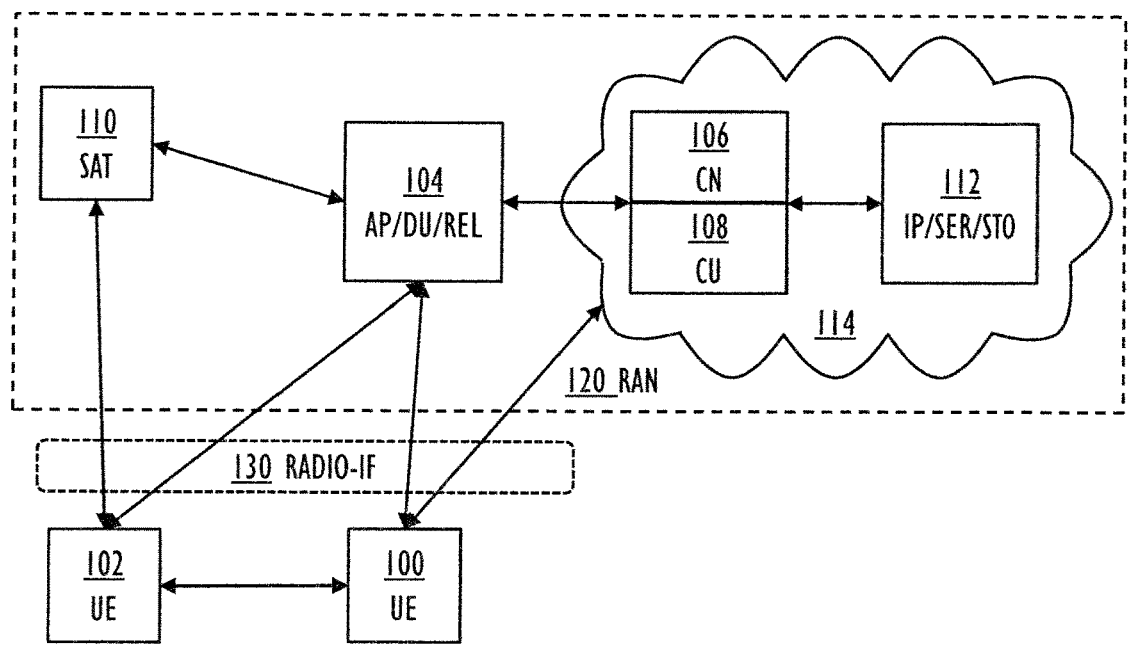

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures besides those shown in FIG. 1.

The embodiments are not, however, restricted to the system given as an example but a person skilled in the art may apply the solution to other communication systems provided with necessary properties.

The example of FIG. 1 shows a part of an exemplifying radio access network 120.

FIG. 1 shows user apparatuses 100 and 102 configured to be in a wireless connection 130 on one or more communication channels in a cell with an access node (such as (e/g)NodeB) 104 providing the cell. The physical link from the user apparatus 100, 102 to the (e/g)NodeB 104 is called uplink or reverse link and the physical link from the (e/g) NodeB 104 to the user apparatus 100, 102 is called downlink or forward link. It should be appreciated that (e/g)NodeBs or their functionalities may be implemented by using any node, host, server or access point etc. entities suitable for such a usage, for example according to a higher layer split architecture, comprising a central-unit (so-called gNB-CU) controlling one or more distributed units (so-called gNB-DU).

A communications system typically comprises more than one (e/g)NodeB 104 in which case the (e/g)NodeBs 104 may also be configured to communicate with one another through logical interfaces (such Xn/X2) running over links, wired or wireless, designed for the purpose. These interfaces may be used for data and signaling purposes. The (e/g)NodeB 104 is a computing device configured to control the radio resources of communication system it is coupled to. The NodeB 104 may also be referred to as a base station, an access point or any other type of interfacing device including a relay station capable of operating in a wireless environment. The (e/g)NodeB 104 includes or is coupled to transceivers. From the transceivers of the (e/g)NodeB 104, a connection is provided to an antenna unit that establishes bi-directional radio links to user apparatuses 100, 102. The antenna unit may comprise a plurality of antennas or antenna elements (sometimes also referred to as antenna panels, or transmission and reception points, TRP). The (e/g)NodeB 104 is further connected to a core network 106 (CN or next generation core NGC). Depending on the system, the counterpart on the CN side can be a serving gateway (S-GW, routing and forwarding user data packets), packet data network gateway (P-GW), for providing connectivity of user apparatuses 100, 102 to external packet data networks, or mobile management entity (MME), access and mobility function (AMF), etc.

The user apparatus 100, 102 (also called user equipment UE, user terminal, terminal device, subscriber terminal, etc.) illustrates one type of an apparatus to which resources on the air interface are allocated and assigned, and thus any feature described herein with a user apparatus may be implemented with a corresponding apparatus, such as a relay node. An example of such a relay node is a layer 3 relay (self-backhauling relay) towards the base station.

The user apparatus 100, 102 typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that the user apparatus 100, 102 may also be a nearly exclusive uplink only device, of which an example is a camera or video camera loading images or video clips to a network. The user apparatus 100, 102 may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user apparatus 100, 102 may also be a device having capability to operate utilizing enhanced machine-type communication (eMTC). The user apparatus 100, 102 may also utilize cloud. In some applications, the user apparatus 100, 102 may comprise a small portable device with radio parts (such as a watch, earphones or eyeglasses) and the computation is carried out in the cloud. The user apparatus 100, 102 (or in some embodiments a layer 3 relay node) is configured to perform one or more of user equipment functionalities. The user apparatus 100, 102 may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave, possibly using the same radio interfaces but with different parametrization). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is typically fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into the radio access network (RAN) 120 by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs 104, the user apparatus 100, 102 may have access to a plurality of radio cells and the system may comprise also other apparatuses, such as physical layer relay nodes or other network elements, etc. At least one of the (e/g)NodeBs 104 may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs 104 of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs 104 are required to provide such a network structure.

For fulfilling the need for improving the deployment and performance of communication systems, the concept of "plug-and-play" (e/g)NodeBs 104 has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

As mentioned, the radio access network 120 may be split into two logical entities called Central Unit (CU) 108 and Distributed Unit (DU) 104. In prior art, both CU and DU supplied by the same vendor. Thus, they are designed together and interworking between the units is easy. The interface between CU and DU may be denoted as F1 interface. Therefore, the network operators may have the flexibility to choose different vendors for CU and DU. Different vendors may provide different failure and recovery characteristics for the units. If the failure and recovery scenarios of the units are not handled in a coordinated manner, it will result in inconsistent states in the CU and DU (which may lead to subsequent call failures, for example). Thus, there is a need to enable the CU and DU from different vendors to coordinate operation to handle failure conditions and recovery, considering the potential differences in resiliency capabilities between the CU and DU.

Figure 2:
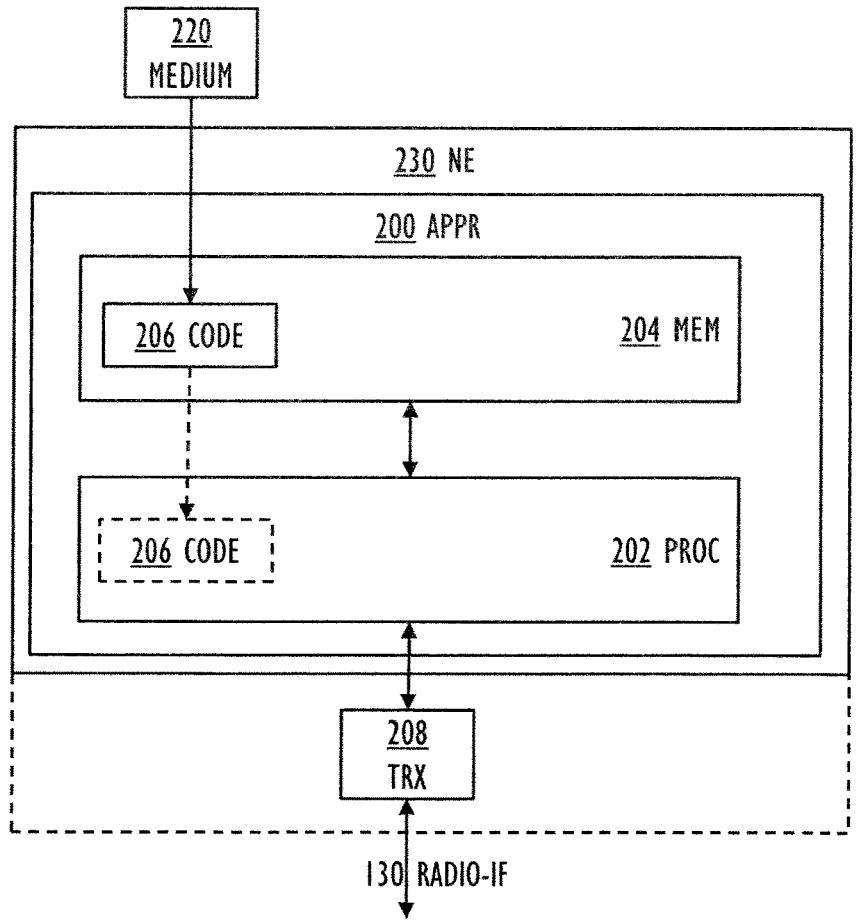
FIG. 2 and FIG. 3 illustrate embodiments of an apparatus for a network element.
Figure 3:
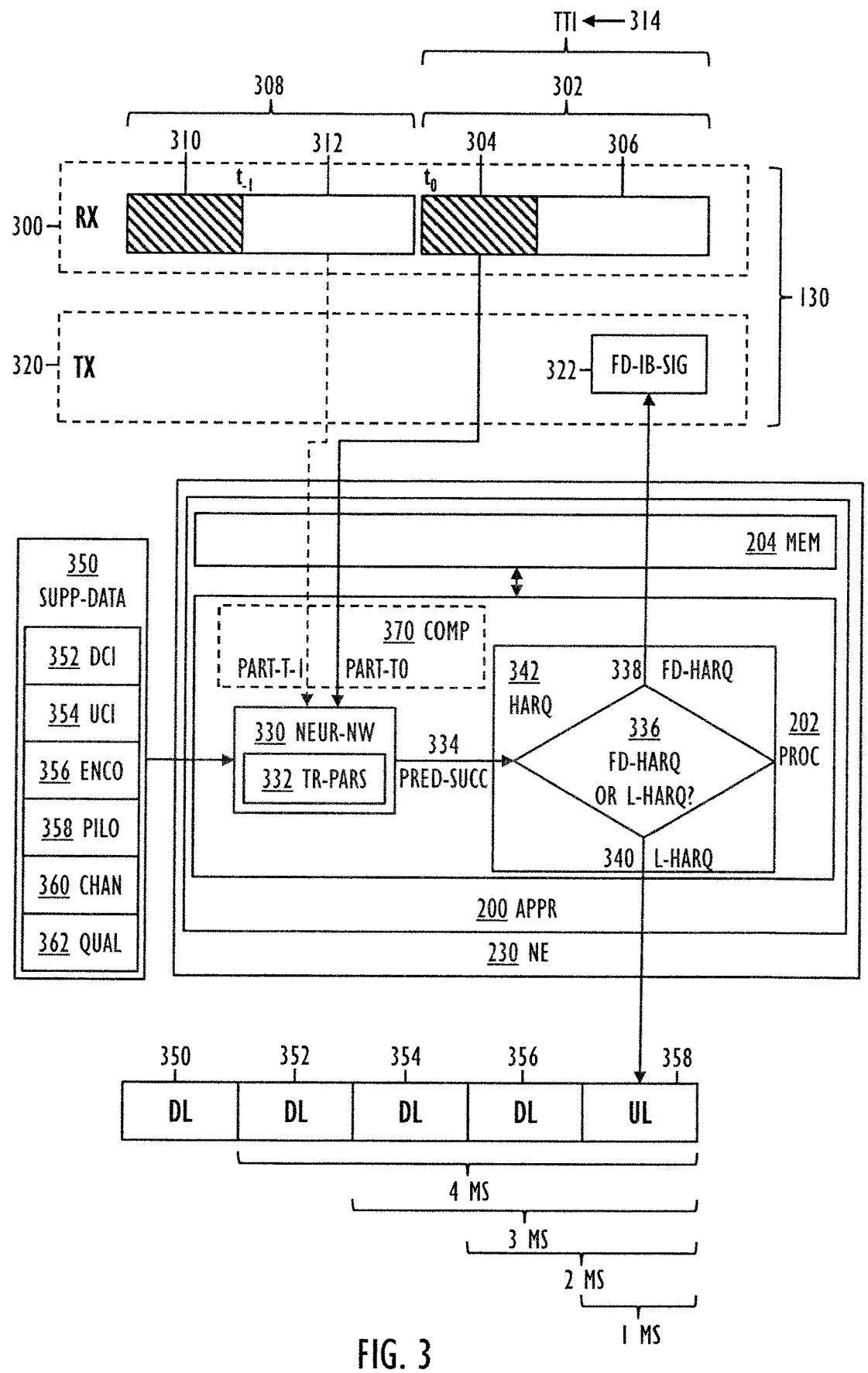
Figure 5:
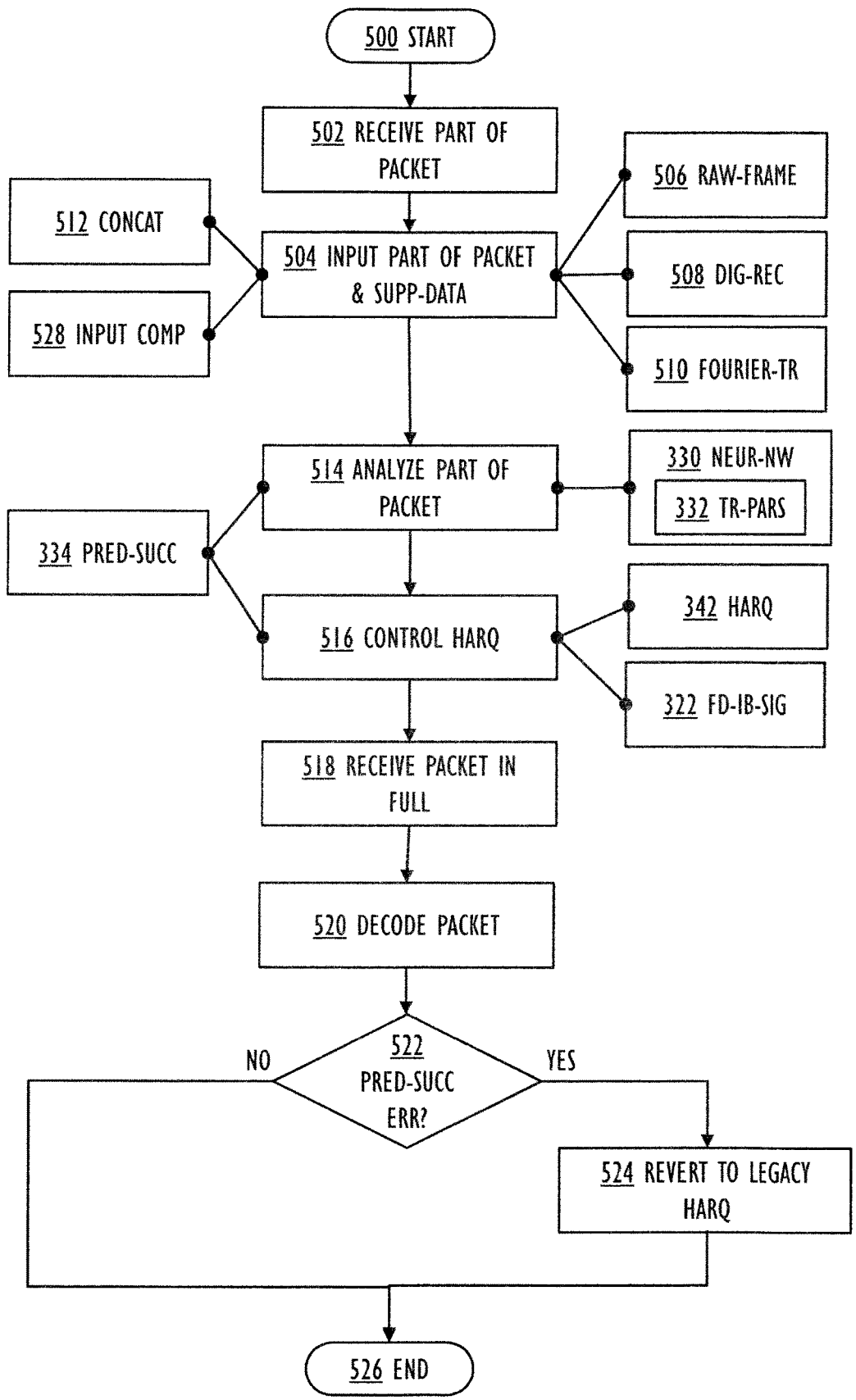
FIG. 5, FIG. 6, FIG. 7, FIG. 8, FIG. 9 and FIG. 10 illustrate embodiments of a method performed by the apparatus for the network element.

Let us study simultaneously both FIG. 2 and FIG. 3, which illustrate embodiments of an apparatus 200 for a network element 230, and FIG. 5, which illustrates embodiments of a method performed by the apparatus 200 for the network element 230.

The apparatus 200 for the network element 230 comprises one or more memories 204 including computer program code 206, and one or more processors 202 to execute the computer program code 206 to cause the apparatus 200 to perform the method.

The term 'processor' 202 refers to a device that is capable of processing data. Depending on the processing power needed, the apparatus 200 may comprise several processors 202 such as parallel processors, a multicore processor, or a computing environment that simultaneously utilizes resources from several physical computer units (sometimes these are referred as cloud, fog or virtualized computing environments). When designing the implementation of the processor 202, a person skilled in the art will consider the requirements set for the size and power consumption of the apparatus 200, the necessary processing capacity, production costs, and production volumes, for example.

A non-exhaustive list of implementation techniques for the processor 202 and the memory 204 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 204 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 206 may be implemented by software. In an embodiment, the software may be written by a suitable programming language, and the resulting executable code may be stored in the memory 204 and executed by the processor 202.

An embodiment provides a computer-readable medium 220 storing the computer program code 206, which, when loaded into the one or more processors 202 and executed by one or more processors 202, causes the one or more processors 202 to perform the algorithm/method, which will be explained with reference to FIG. 5. The computer-readable medium 220 may comprise at least the following: any entity or device capable of carrying the computer program code 206 to the one or more processors 202, a record medium, a computer memory, a read-only memory, an electrical carrier signal, a telecommunications signal, and a software distribution medium. In some jurisdictions, depending on the legislation and the patent practice, the computer-readable medium 220 may not be the telecommunications signal. In an embodiment, the computer-readable medium 220 may be a computer-readable storage medium. In an embodiment, the computer-readable medium 220 may be a non-transitory computer-readable storage medium.

The computer program code 206 implements the method as an algorithm analyzing a data packet 302, and controlling a hybrid automatic repeat request procedure 342 associated with the data packet 302. The computer program code 206 may be coded as a computer program (or software) using a programming language, which may be a high-level programming language, such as C, C++, or Java, or a low-level programming language, such as a machine language, or an assembler, for example. The computer program code 206 may be in source code form, object code form, executable file, or in some intermediate form. There are many ways to structure the computer program code 206: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 206 for performing a wide variety of standard operations. In addition, an operating system (such as a general-purpose operating system) may provide the computer program code 206 with system services.

In an embodiment, the one or more processors 202 may be implemented as one or more microprocessors implementing functions of a central processing unit (CPU) on an integrated circuit. The CPU is a logic machine executing the computer program code 206. The CPU may comprise a set of registers, an arithmetic logic unit (ALU), and a control unit (CU). The control unit is controlled by a sequence of the computer program code 206 transferred to the CPU from the (working) memory 204. The control unit may contain a number of microinstructions for basic operations. The implementation of the microinstructions may vary, depending on the CPU design.

In an embodiment, the network 230 element is the user apparatus 100.

In an embodiment, the network element 230 is a network element of the radio access network 120.

The apparatus 200 for the network element 230 may be a stand-alone apparatus 200 as shown in FIG. 2, i.e., the apparatus 100 is a separate unit, distinct from the user apparatus 100 and the part 104, 106, 108, 110, 112 of the radio access network 120. However, in an embodiment, at least a part of the structure of the apparatus 200 may be more or less integrated with another apparatus: the apparatus 200 may be a part of the user apparatus 100, and/or the apparatus 200 belongs to the network element 104, 106, 108, 110, 112 of the radio access network 120. In such a case, a radio receiver 208 may also be a part of the network element 230 containing the apparatus 200. In another embodiment, the apparatus 200 is a networked server apparatus accessible through a wired and/or wireless communication network. The networked server apparatus 200 may be a networked computer server operating according to a client-server architecture, a cloud computing architecture, a peer-to-peer system, or another applicable computing architecture.

In an embodiment, the apparatus 200 comprises means for causing the apparatus 200 to perform the method.

The operations are not strictly in chronological order in FIG. 5, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 500 and ends in 526. Note that the method may run as long as required (after the start-up of the apparatus 200 until switching off) by looping back from operation 522 or 524 back to 502.

In an embodiment, a beginning part 304 of a data packet 302 received on a specific frequency band and in a scheduled slot between a user apparatus 100 and a radio access network 120 is analyzed 514 to predict a success 334 of decoding 520 the data packet 302 after received 518 in full.

In an embodiment, the beginning part 304 of the data packet 302 is analyzed 514 to predict the success 334 with a neural network 330 with trained parameters 332.

In an embodiment, the beginning part 304 of the data packet 302 received on the specific frequency band and in the scheduled slot between the user apparatus 100 and the radio access network 120, and supplementary data 350 related to the data packet 302, are inputted 504 into the neural network 330 with the trained parameters 332 to predict the success 334 of decoding 520 the data packet 302 after received 518 in full.

In an embodiment, the beginning part 304 of the data packet 302 is inputted 504 as raw radio frame data 506 into the neural network 330.

In an embodiment, the beginning part 304 of the data packet 302 is inputted 504 into the neural network 330 as digitized receiver data 508 or Fourier transformed data 510. The length of the beginning part 304 is denoted by $\Delta T$. The digitized receiver data 508 may be in the baseband during the first $\Delta T$ (0.25 ms, for example). The Fourier transformed data may be inputted as a matrix with rows representing subcarrier frequencies and columns representing the symbols received in full during the $\Delta T$.

In an embodiment, the beginning part 304 of the data packet 302 is concatenated 512 with an end part 312 of a previous data packet 308 to get a complete data packet 370, and the complete data packet 370 is inputted 528 into the neural network 330 to predict the success 334. As shown in FIG. 3, at time $t_0$, the reception of the data packet 302 begins: the beginning part 304 is received first, and then the end part 306. Reception of an end part 312 of the previous data packet 308 starts at time $t_{-1}$. A beginning part 310 of the previous data packet 308 may have been used to predict the success of decoding of the previous data packet 308.

In a hybrid automatic repeat request procedure 342, besides the ARQ error control using retransmissions, also forward error-correcting (FEC) coding and error-detecting (ED) coding are used (or a coding such as Reed-Solomon code capable of performing both error-correcting and error-detecting). As the success 334 is predicted using only the beginning part 304 of the data packet 302, the supplementary data 350 related to the data packet 302 is such data that is obtainable before the whole data packet 302 with the beginning part 304 and the end party 306 is received 518 and decoded 520.

In an embodiment, downlink control information 352 or uplink control information 354 related to the data packet 302 is inputted 504 as the supplementary data 350 into the neural network 330 to predict the success 334.

In an embodiment, encoding information 356 related to the data packet 302 is inputted 504 as the supplementary data 350 into the neural network 330 to predict the success 334. The encoding information 356 may define the used encoding of the radio signal 130 carrying the data packet 302, such as PSK (Phase-Shift Keying), QAM (Quadrature Amplitude Modulation), etc.

In an embodiment, location information 358 of a pilot signal related to the data packet 302 is inputted 504 as the supplementary data 350 into the neural network 330 to predict the success 334. The pilot signal includes known reference symbols, which may be used by the receiver 208 to estimate status of the radio channel 130 transporting the data packet 302.

In an embodiment, an estimated channel 360 related to the data packet 302 is inputted 504 as the supplementary data 350 into the neural network 330 to predict the success 334. The channel estimation utilizes the known pilot signal in order to estimate the time-varying radio channel 130.

In an embodiment, a quality parameter 362 related to the data packet 302 is inputted 504 as the supplementary data 350 into the neural network 330 to predict the success 334. The quality parameter 362 may be related to the radio signal 130 carrying the data packet 302.

In an embodiment, the quality parameter 362 comprises a signal-to-interference-plus-noise ratio (SINR) of the radio signal 130 that transported the data packet 302.

In 516, the hybrid automatic repeat request procedure 342 associated with the data packet 302 is controlled based on the predicted success 334 using the specific frequency band and the scheduled slot for full-duplex inband signaling 322.

As shown in FIG. 3, the full-duplex inband signaling 322 is transmitted using transmission radio resources 320 during reception of a remaining part 306 of the data packet 302 with reception radio resources 300. In this way, the latency is reduced as there is no need to wait for a scheduling decision to use the radio resources available after the data packet 302 has been received in full. The upper part of FIG. 3 illustrates an example of the current 5G New Radio (NR) architecture without the minislots for the normal cyclic prefix (CP) case with numerology=0. The lower part of FIG. 3 illustrates the HARQ latency for 5G NR systems with numerology 1, where each slot is 1 ms long, and a DL heavy frame structure is used. As is evident from FIG. 3, the HARQ latency with full-duplex acknowledgements is 1 ms (millisecond). It is easy to calculate that the average latency of delivering the HARQ feedback for the DL transport blocks (TB) is in the best case 2.5 ms (=(4+3+2+1)/4), as it may only be carried out during every fifth UL slot 358 after the four DL slots 350, 352, 354, 356. Moreover, this amount of time does not even consider the time it takes to decode the TBs, which for DL data is 0.2-1 ms and for UL data 0.3-0.8 ms. Consequently, it may be concluded that the HARQ procedure 342 using the full-duplex inband signaling 322 reduces the latency at least by a factor of 2.5, but most likely even more than that.

In an embodiment, the hybrid automatic repeat request procedure 342 associated with the data packet 302 is controlled 516 during a transmission time interval (TTI) 314 of the data packet 302.

In an embodiment, the hybrid automatic repeat request procedure 342 associated with the data packet 302 is controlled 516 before the data packet 302 is received 518 in full and decoded 520.

In an embodiment, the data packet 302 is received in 518 in full, and the data packet 302 is decoded in 520 after received 518 in full, and, if the predicted success was erroneous 522-YES, a legacy hybrid automatic repeat request procedure is reverted to in 524.

The embodiments may enable a lower latency between the reception and acknowledgement of the data packet 302, which in LTE and 5G systems may be in the order of milliseconds. This is one of the most significant bottlenecks for reducing the latency of the next generation wireless networks.

Two features may enable the reduction of the HARQ latency:
1. Determine more quickly whether the data packet can be decoded or not.
2. Transmit the acknowledgement without having to wait for a scheduling decision.

The first feature is related to the decoding, which means that the associated latency depends largely on the decoder performance. With low-density parity-check (LDPC) codes, the latency depends on the number of iterations, more of which are required for lower signal-to-noise ratios (SNR). The second feature, on the other hand, depends on the amount of available resources and the slot configuration of the network. In some cases, this may result in considerable latency if one must wait for a suitable slot for transmitting the HARQ feedback.

It should also be noted that 5G includes the option for using so-called minislots, where a single slot includes both uplink (UL) and downlink (DL) symbols. This facilitates also much shorter latencies as it is possible to send NACK and receive a retransmission within a single slot. However, it is to be expected that in most of the cases such minislots are not used due to the associated overhead, meaning that each slot is dedicated to either UL or DL.

The main idea of the embodiments is to facilitate HARQ feedback within the same slot/TTI as the corresponding transport block (TB). This will considerably reduce the latency of retransmissions as it is not necessary to wait for a suitable slot for the ACK/NACK message. This is particularly beneficial for the cases where minislots are not used, although the same principles may also be applied to minislots if extremely low latencies are required. The two main ingredients of the embodiments are as follows:

Use machine learning (ML)-based solutions to predict if the current TB is going to be successfully decoded or not.

Transmit the predicted ACK/NACK feedback within the same slot and on the same frequency resources as the data packet 302, using inband full-duplex communications 322.

Therefore, the transmitter will receive the ACK/NACK feedback without any latency due to the decoding process and without any dedicated resources for the feedback.

Figure 4:
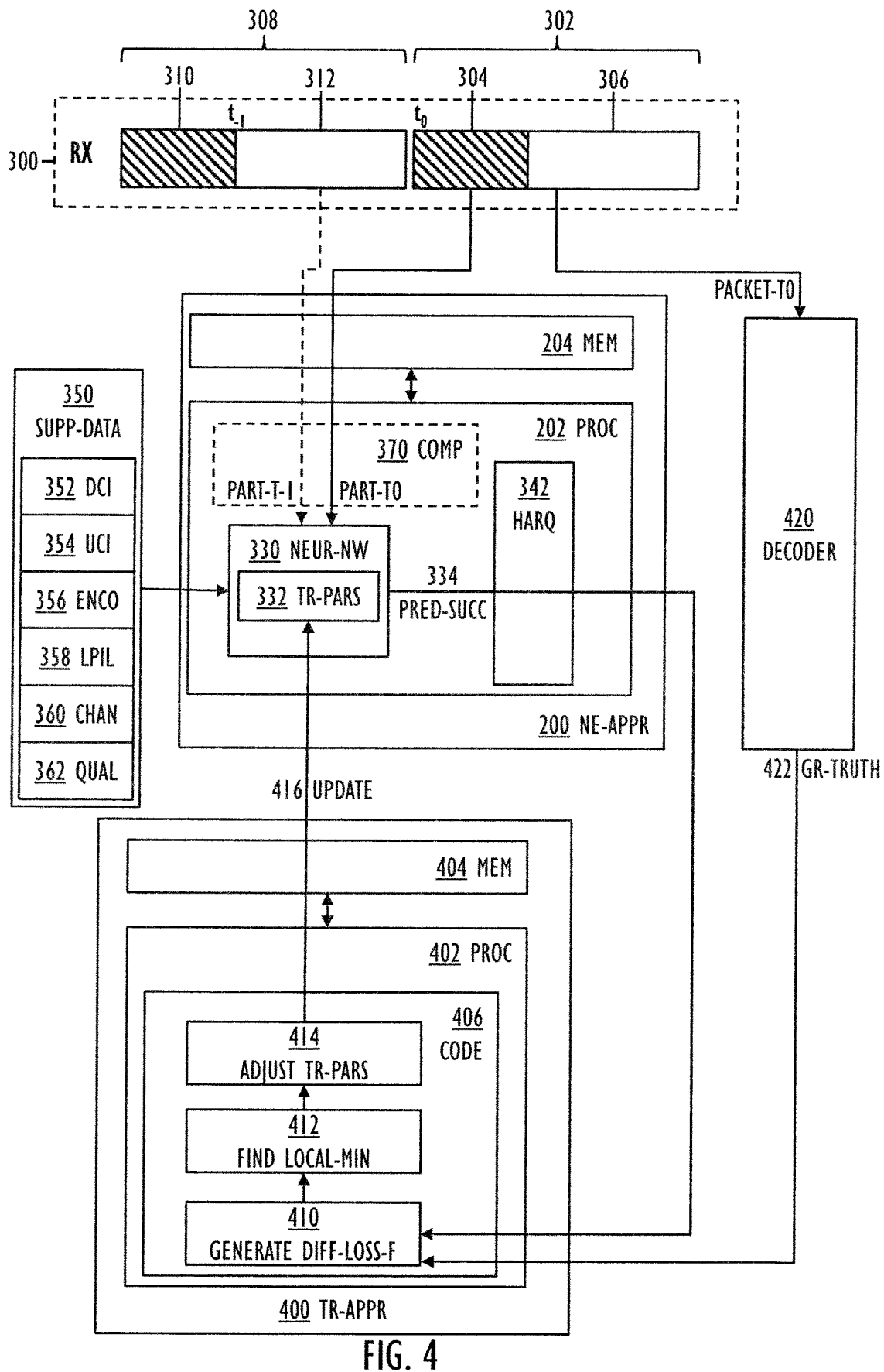
FIG. 4 illustrates an embodiment of a system comprising the apparatus for the network element, a training apparatus, and a decoder.

FIG. 4 illustrates a system comprising the apparatus 200 for the network element 230, a training apparatus 400, and a decoder 420. The purpose of the system is to train the trained parameters 332 of the neural network 300.

The data 302, 308 for training may be collected by recording normal operational data from receivers 208. The ground truth (or labels) 412 for the data may be obtained by applying normal Turbo decoder 420 as in legacy HARQ. The decoder 420 decodes the data packet 302 after received in full, and inputs the realized success of the decoding as a ground truth 422 into the training apparatus 400. The decoder 420 may be implemented with the hardware and software resources of the training apparatus 400, but it may also be a separate unit as in FIG. 4, implemented with suitable hardware and software, or even as a pure hardware implementation (with an ASIC, for example).

The inputs listed in FIG. 4 are the same as in FIG. 3, with the exception of the ground truth 422.

The training apparatus 400 comprises one or more memories 404 including computer program code 406, and one or more processors 402 to execute the computer program code 406 to cause the performance of the training apparatus 400.

In 410, a differentiable loss function (a binary cross-entropy loss, for example) value between the predicted success 334 and the realized success 422 is generated, and in 414, the trained parameters 332 are adjusted based on the loss function value.

In an embodiment, using a stochastic gradient descent algorithm, a local minimum of the differentiable loss function is found 412 as the differentiable loss-function value. Besides the basic stochastic gradient descent algorithm, its improvements or any other iterative learning algorithm may be used to find the local minimum.

Figure 13:
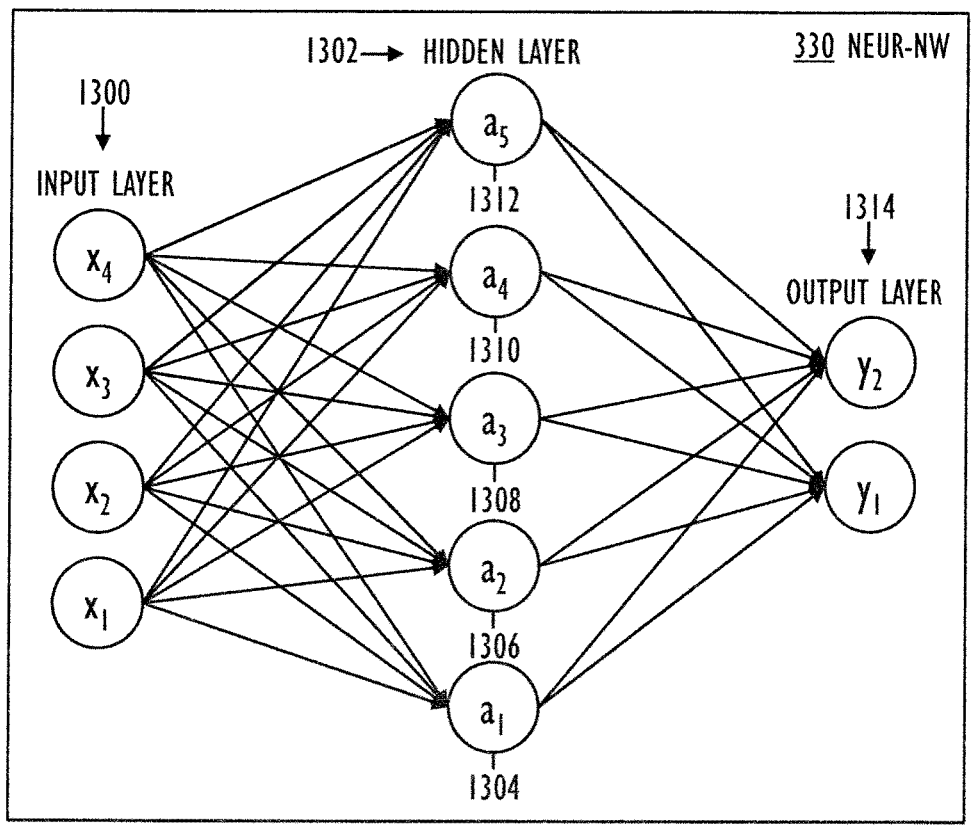
FIG. 13 and FIG. 14 illustrate embodiments of a neural network.
Figure 14:
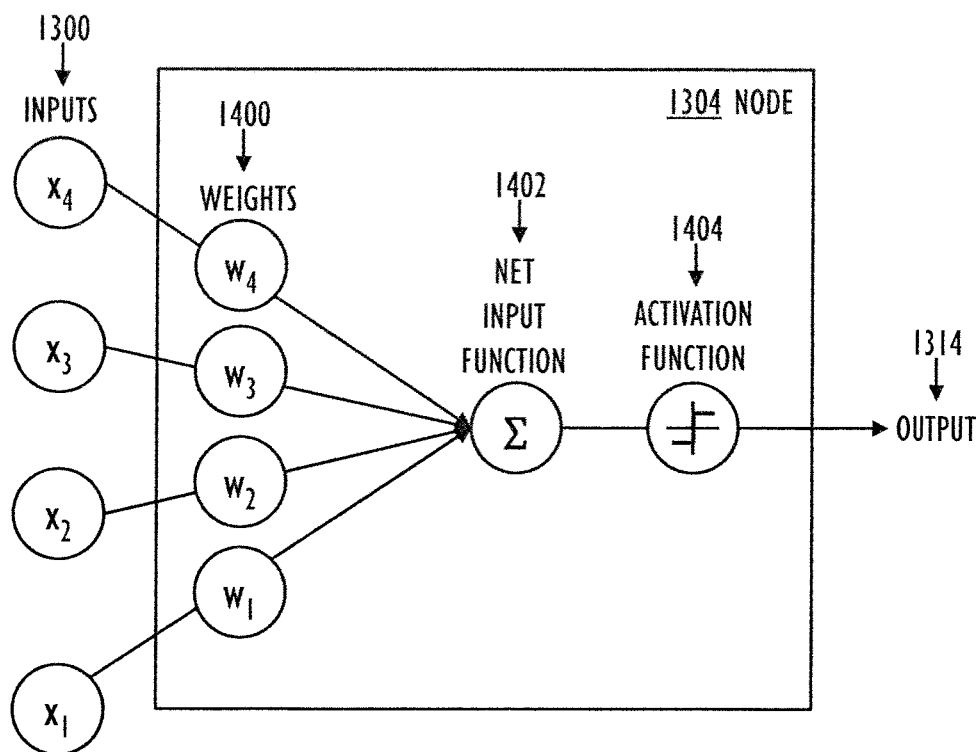

FIG. 13 illustrates an embodiment of the neural network 330 with one hidden layer, and FIG. 14 illustrates an embodiment of a computational node.

Deep learning (also known as deep structured learning or hierarchical learning) is part of a broader family of machine learning methods based on the layers used in artificial neural networks.

An artificial neural network (ANN) 330 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning. Deep learning typically requires a large amount of input data.

A deep neural network (DNN) 330 is an artificial neural network comprising multiple hidden layers 1302 between the input layer 1300 and the output layer 1314. Training of DNN allows it to find the correct mathematical manipulation to transform the input into the proper output even when the relationship is highly non-linear and/or complicated.

Each hidden layer 1302 comprise nodes 1304, 1306, 1308, 1310, 1312, where the computation takes place. As shown in FIG. 14, each node 1304 combines input data 1300 with a set of coefficients, or weights 1400, that either amplify or dampen that input 1300, thereby assigning significance to inputs 1300 with regard to the task the algorithm is trying to learn. The input-weight products are added 1402 and the sum is passed through an activation function 1404, to determine whether and to what extent that signal should progress further through the network 330 to affect the ultimate outcome, such as an act of classification. In the process, the neural networks learn to recognize correlations between certain relevant features and optimal results.

In the case of classification, the output of deep-learning network 330 may be considered as a likelihood of a particular outcome, such as in this case a probability of decoding success of a data packet. In this case, the number of layers 1302 may vary proportional to the number of used input data 1300. However, when the number of input data 1300 is high, the accuracy of the outcome 1314 is more reliable. On the other hand, when there are fewer layers 1302, the computation might take less time and thereby reduce the latency. However, this highly depends on the specific DNN architecture and/or the computational resources.

Initial weights 1400 of the model can be set in various alternative ways. During the training phase they are adapted to improve the accuracy of the process based on analyzing errors in decision making. Training a model is basically a trial and error activity. In principle, each node 1304, 1306, 1308, 1310, 1312 of the neural network 330 makes a decision (input*weight) and then compares this decision to collected data to find out the difference to the collected data. In other words, it determines the error, based on which the weights 1400 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 1400 so that the next evaluation reduces the error, meaning the optimization algorithm is navigating down the gradient (or slope) of error. It is also possible to use any other suitable optimization algorithm if it provides sufficiently accurate weights 1400. Consequently, the trained parameters 332 of the neural network 330 may comprise the weights 1400.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 1400, any suitable method may be used as a loss function, some examples are mean squared error (MSE), maximum likelihood (MLE), and cross entropy.

As for the activation function 1404 of the node 1304, it defines the output 1314 of that node 1304 given an input or set of inputs 1300. The node 1304 calculates a weighted sum of inputs, perhaps adds a bias and then makes a decision as "activate" or "not activate" based on a decision threshold as a binary activation or using an activation function 1404 that gives a nonlinear decision function. Any suitable activation function 1404 may be used, for example sigmoid, rectified linear unit (ReLU), normalized exponential function (softmax), softplus, tan h, etc. In deep learning, the activation function 1404 is usually set at the layer level and applies to all neurons in that layer. The output 1314 is then used as input for the next node and so on until a desired solution to the original problem is found.

Figure 6:
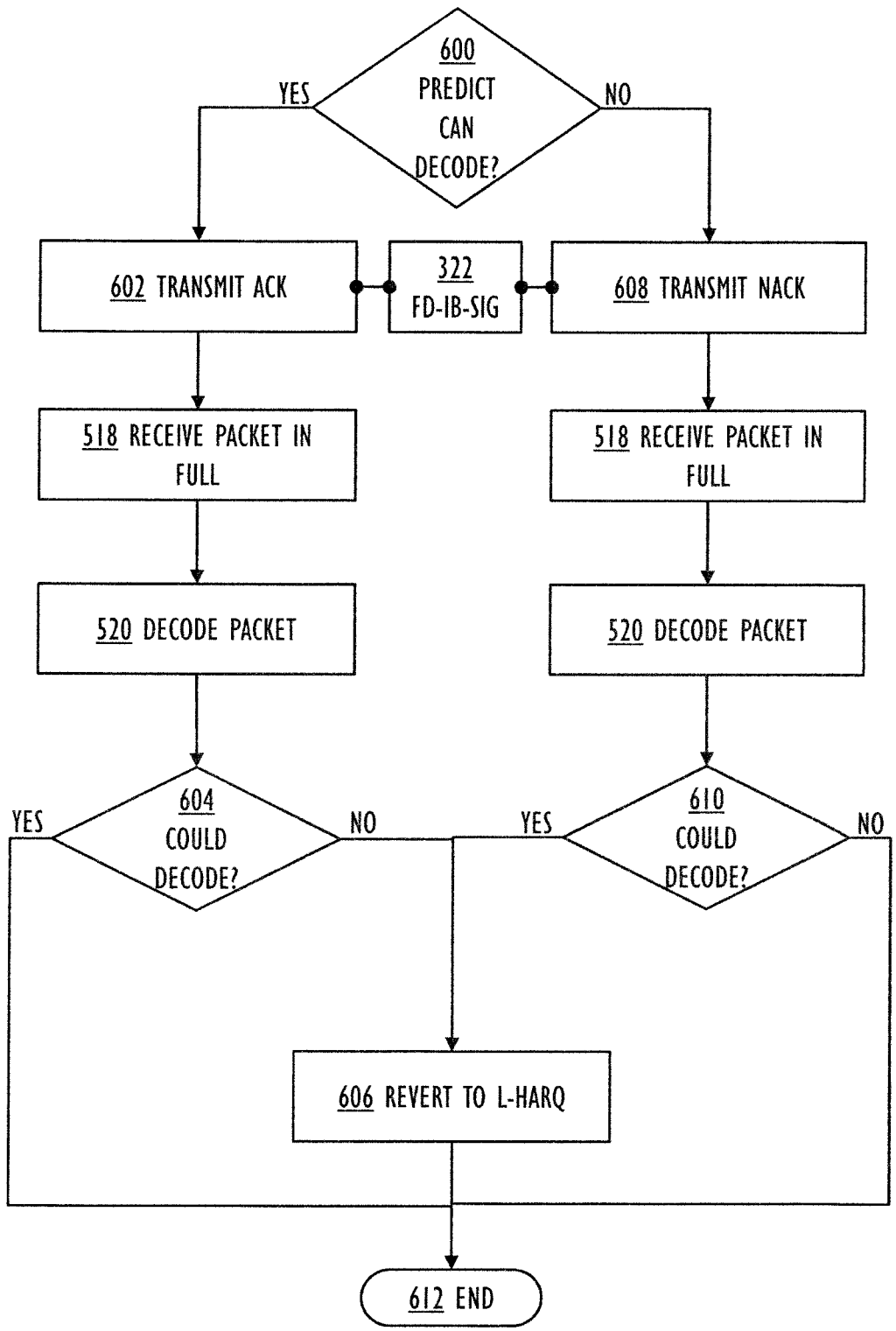

With reference to FIG. 6, let us study controlling 516 the hybrid automatic repeat request procedure 342 associated with the data packet 302 for downlink, wherein the base station 104 is the initial transmitter and the user apparatus 100 is the receiver.

In 600, a test is performed regarding the predicted success 334.

If the predicted success 334 indicates 600-YES that the decoding 520 of the data packet 302 will succeed, an acknowledgement (ACK) associated with the data packet 302 is transmitted in 602 using the specific frequency band and the scheduled slot for the full-duplex inband signaling 322.

If the predicted success 334 indicates 600-NO that the decoding 520 of the data packet 302 will fail, a negative acknowledgement (NACK) associated with the data packet 302 is transmitted in 608 using the specific frequency band and the scheduled slot for the full-duplex inband signaling 322.

FIG. 6 also illustrates the embodiment of 522, 524 of FIG. 5. The data packet 302 is received in 518 in full, and the data packet 302 is decoded in 520 after received 518 in full. The test (predicted success erroneous?) 522 of FIG. 5 may be performed in FIG. 6 as two separate tests (could decode?) 604, 610 for ACK- and NACK branches, and if the predicted success was erroneous, the legacy hybrid automatic repeat request procedure is reverted to in 606.

Figure 7:
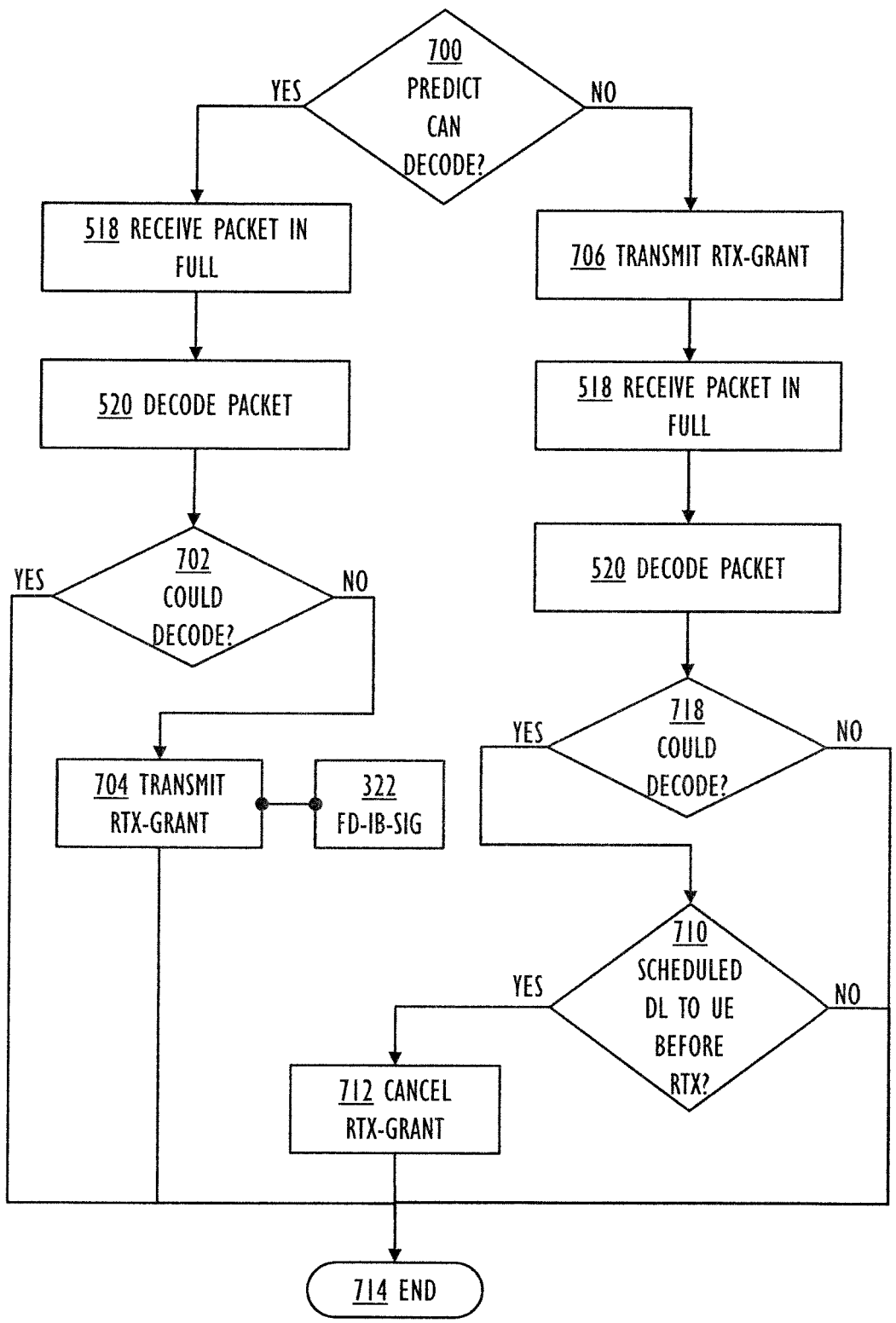

With reference to FIG. 7, let us study controlling 516 the hybrid automatic repeat request procedure 342 associated with the data packet 302 for uplink, wherein the user apparatus 100 is the initial transmitter and the base station 104 is the receiver.

In this case, according to 5G NR specifications, no explicit ACK or NACK is used, meaning that the only HARQ feedback is an implicit NACK message in the form of a grant for retransmission (RTX). If the UE 100 receives such a grant, it knows that the previous transmission failed and a retransmission (RTX) is required. Therefore, in case of the HARQ procedure 342 with the full-duplex inband signaling 322, only a negative prediction triggers an action, i.e., the UE 100 is informed that RTX is needed and the required resources are also granted.

In 700, a test is performed regarding the predicted success 334.

If the predicted success 334 indicates 700-YES that the decoding 520 of the data packet 302 will succeed, no specific action is needed.

If the predicted success 334 indicates 700-NO that the decoding 520 of the data packet 302 will fail, a grant for retransmission (UL grant for RTX) associated with the data packet 302 is transmitted in 706 using the specific frequency band and the scheduled slot for the full-duplex inband signaling 322.

FIG. 7 also illustrates the embodiment of 522, 524 of FIG. 5. The data packet 302 is received in 518 in full, and the data packet 302 is decoded in 520 after received 518 in full. The test (predicted success erroneous?) 522 of FIG. 5 may be performed in FIG. 7 as two separate tests (could decode?) 702, 718 for NO ACTION- and RTX-GRANT -branches, and if the predicted success was erroneous, the full-duplex inband signaling 322 is used to transmit RTX-GRANT in 704, or if there is scheduled downlink 710-YES to the user apparatus 100 before the scheduled RTX takes place, the base station 104 cancels the grant for the user apparatus 100 in 712. However, if the base station 104 is not able to cancel the retransmission, the UE 100 will perform the RTX and the base station 104 will promptly discard it.

Figure 8:
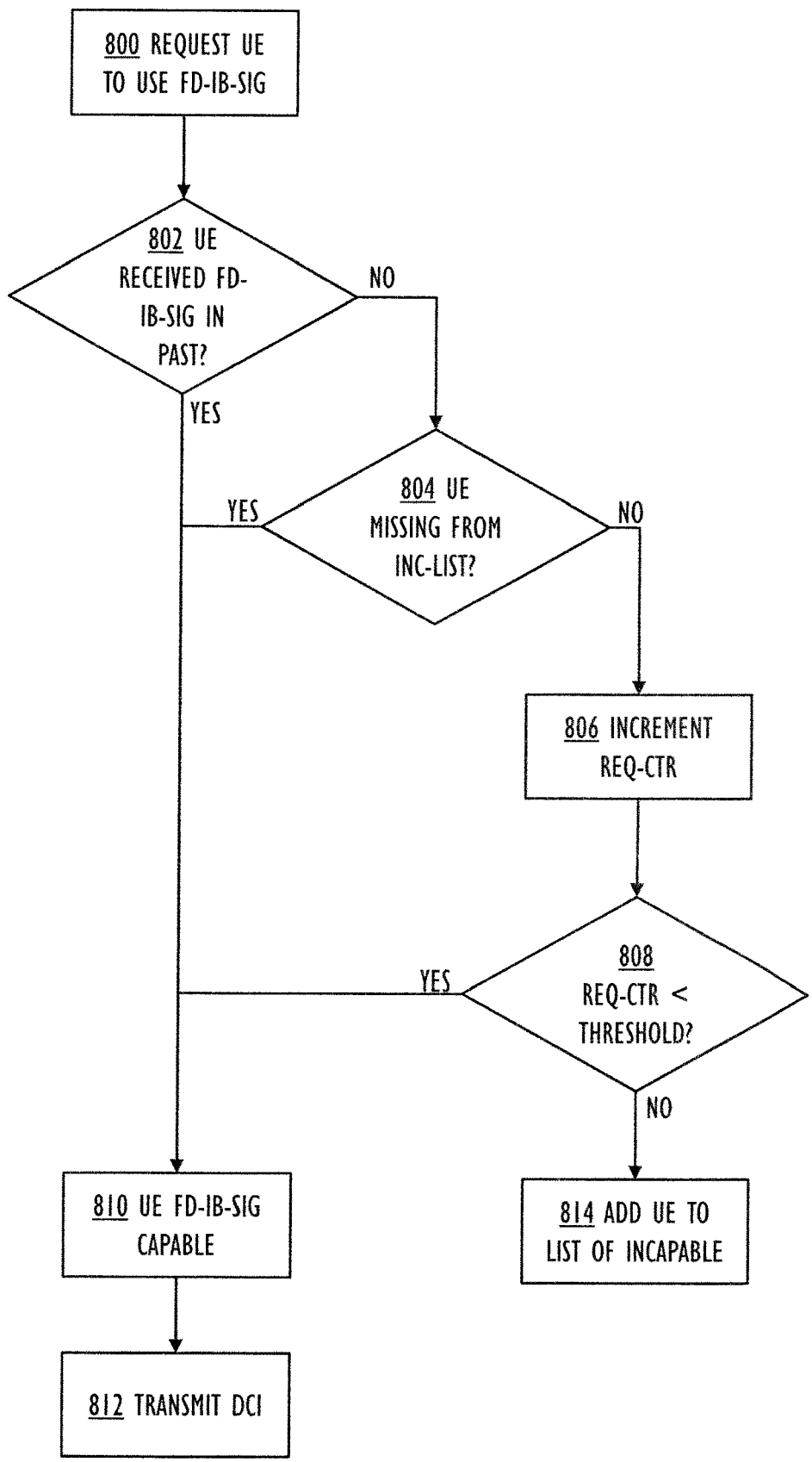

In order to utilize the HARQ procedure 342 with the full-duplex inband signaling 322, the receiver and the transmitter need to be aware of each other's capability and willingness to perform the HARQ procedure 342 with the full-duplex inband signaling 322. It would be power-inefficient to be constantly running the receiver while transmitting when the other party is not even planning to engage in the full-duplex inband signaling 322. This may be done by suitable information at least in the downlink control information (DCI) packet, but potentially also in the uplink control information (UCI) packet. With such FD-HARQ bit(s), it is possible to know which network nodes are capable of utilizing the full-duplex inband signaling 322 for the HARQ procedure 342 by having the base station 104 to maintain a table where the full-duplex inband signaling capable UEs 100, 102 are listed. Considering first the case where only the DCI contains the FD-HARQ bit, FIG. 8 describes the basic procedure for determining the FD-capable UEs 100, 102 from the perspective of the base station 104. The FD-capability is determined by requesting the new UEs 100, 102 to use the full-duplex inband signaling 322 for the HARQ procedure 342 for a predetermined number of times (defined by a parameter N, wherein N is any integer greater than 0).

The basic procedure contains three tests 802, 804, 808.

In 810, it is decided that the user apparatus 100 possesses a capability to receive the full-duplex inband signaling 322 of the hybrid automatic repeat request procedure 342, if the user apparatus 100 is recorded of having received 802-YES) the full-duplex inband signaling 322 of the hybrid automatic repeat request procedure 342 in the past, or if the user apparatus 100 is missing 804-YES from a list of user apparatuses being incapable to receive the full-duplex inband signaling 322 of the hybrid automatic repeat request procedure 342, or if the user apparatus 100 has not yet failed 808-YES to receive the full-duplex inband signaling 322 of the hybrid automatic repeat request procedure 342 for at least a predetermined number of times.

If the user apparatus 100 possesses the capability, downlink control information indicating that the user apparatus 100 possesses the capability is transmitted in 812.

However, if the user apparatus 100 fails 808 NO to receive the full-duplex inband signaling 322 for a predetermined number of times, said user apparatus 100 is added to the list of user apparatuses being incapable. The test 808 may be implemented by testing a request counter, whose initial value is zero, and which is incremented in 806 every time the user apparatus 100 is requested to use the full-duplex inband signaling 322 in 800.

With this basic procedure, no separate FD-HARQ indicator is required in the UL direction, which reduces the overhead.

Figure 9:
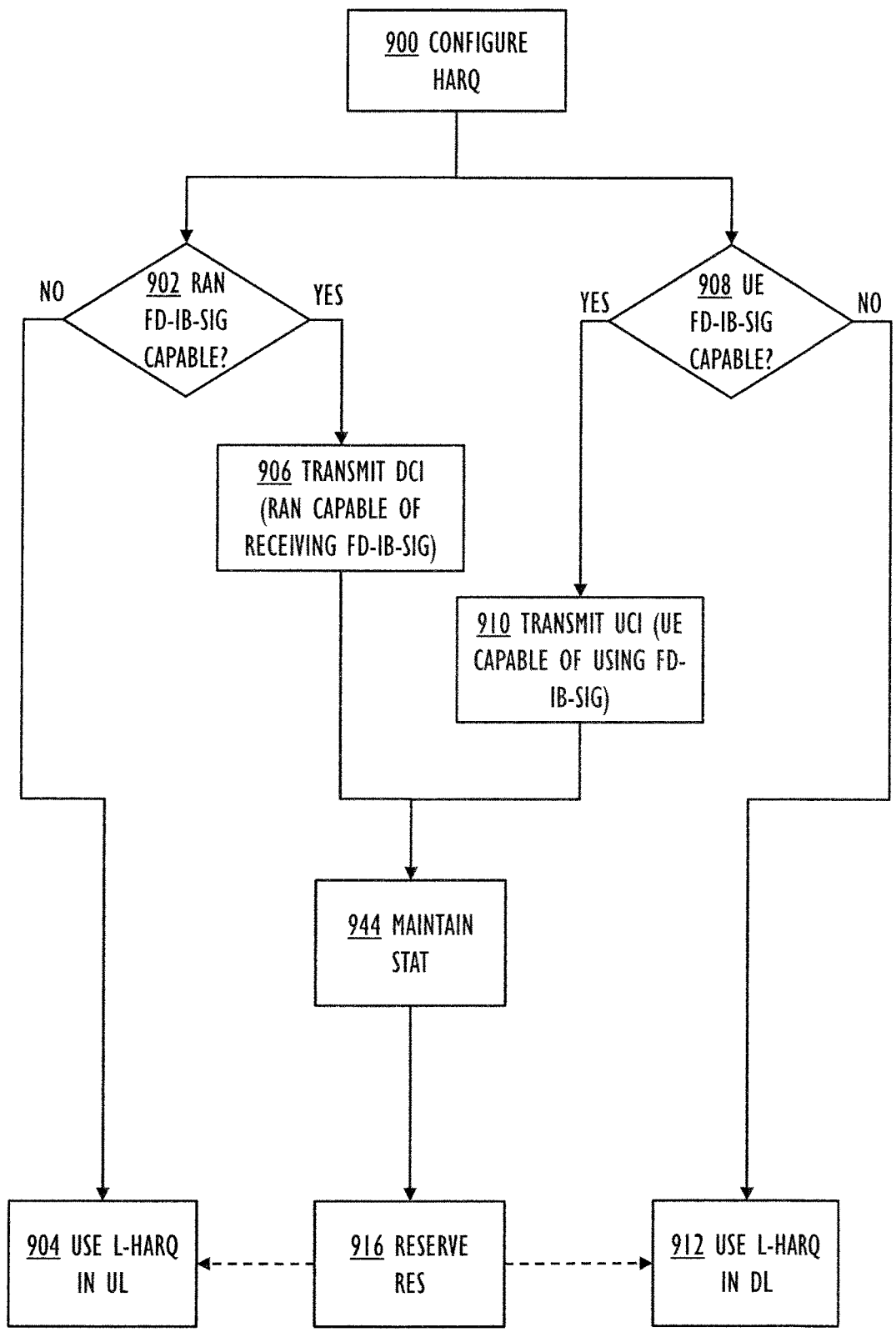

Instead of the basic procedure, an alternative procedure of FIG. 9 may be used, which may result in an asymmetric full-duplex inband signaling 322 of the HARQ procedure 342, where it is only utilized in DL or UL. For this, an explicit FD-HARQ indicator is also included in the UCI, which makes it faster to identify the FD-capable UEs 100. In addition, by signaling the FD-HARQ capability separately for DL and UL, the procedure may be made more versatile.

The configuration of the HARQ procedure 342 with binary FD-HARQ capability indicator bit in both DCI and UCI begins in 900. The left-hand branch shows the configuration for the uplink, and the right-hand branch for the downlink.

If the radio access network 120 possesses 902-YES the capability to receive the full-duplex inband signaling 322, downlink control information indicating a capability of the radio access network 120 to receive the full-duplex inband signaling 322 of the hybrid automatic repeat request procedure 342 is transmitted in 906, or else 902-NO controlling 904 the hybrid automatic repeat request procedure 342 is controlled in 904 to use a legacy hybrid automatic repeat request procedure in the uplink.

If the user apparatus 100 possesses 908-YES the capability to use the full-duplex inband signaling 322, uplink control information indicating a capability of the user apparatus 100 to receive the full-duplex inband signaling 322 of the hybrid automatic repeat request procedure 342 is transmitted in 910, or else 908-NO the hybrid automatic repeat request procedure 342 is controlled in 912 to use a legacy hybrid automatic repeat request procedure in the downlink.

Figure 10:
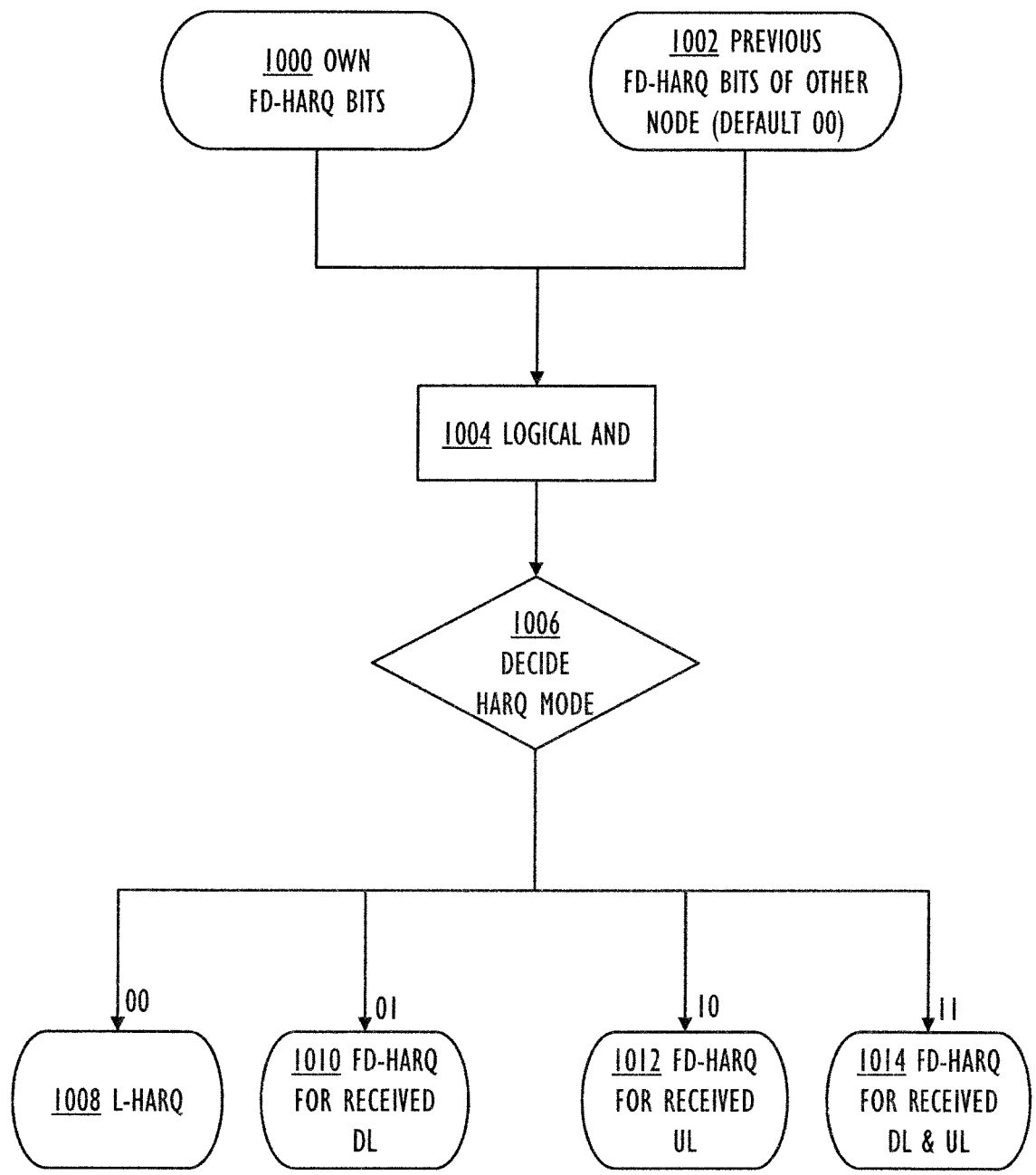

For the alternative procedure where each node signals its FD-HARQ capability in UL and DL with separate bits, these FD-HARQ bits may be processed as shown in FIG. 10. Each node will explicitly signal its FD-HARQ capability 1000 to the other parties, and the two communicating nodes calculate the bit-wise logical AND 1004 of their respective FD-HARQ preferences 1000, 1002. The most recent FD-HARQ notification 1002 of the other node should be used. If no up-to-date information is available, the bits 1002 of the other node may be set to zeros, which results in "00" for the legacy HARQ 1008, when deciding the mode of the HARQ procedure 342 in 1006. Other alternatives are: "01" for the HARQ procedure 342 with the full-duplex inband signaling 322 for the received downlink, "10" for the HARQ procedure 342 with the full-duplex inband signaling 322 for the received uplink, and "11" for the HARQ procedure 342 with the full-duplex inband signaling 322 for both the received downlink and the received uplink. Naturally, the values of the bits may be different to those shown, but the embodiment serves to illustrate that the signaling may be implemented with a minimum of one bit for the DL and one bit for the UL, meaning that both DCI and UCI contain two bits that indicate the FD-HARQ capability of the corresponding device.

In an embodiment illustrated in FIG. 9, statistics indicating a proportion of full-duplex inband signaling 322 capable network elements, and a proportion of correct predictions are maintained in 944, and resources for the legacy hybrid automatic repeat request procedure are reserved in 916 based on the statistics.

Maintaining the option of falling back to the legacy HARQ feedback in case of wrong predictions requires that some resources for that are kept available. In the simplest case, the resources may be allocated under the assumption that the legacy HARQ is always used, in which case the use of the full-duplex inband signaling 322 proposed solution improves the latency. However, if the proportion of FD-HARQ capable devices and the accuracy of the decoding predictions are known, the amount of required legacy HARQ resources may be deduced in advance. This facilitates improvements in spectral efficiency by having a reduced HARQ resource pool for the FD-HARQ nodes, which is required only in case of false predictions.

Figure 11:
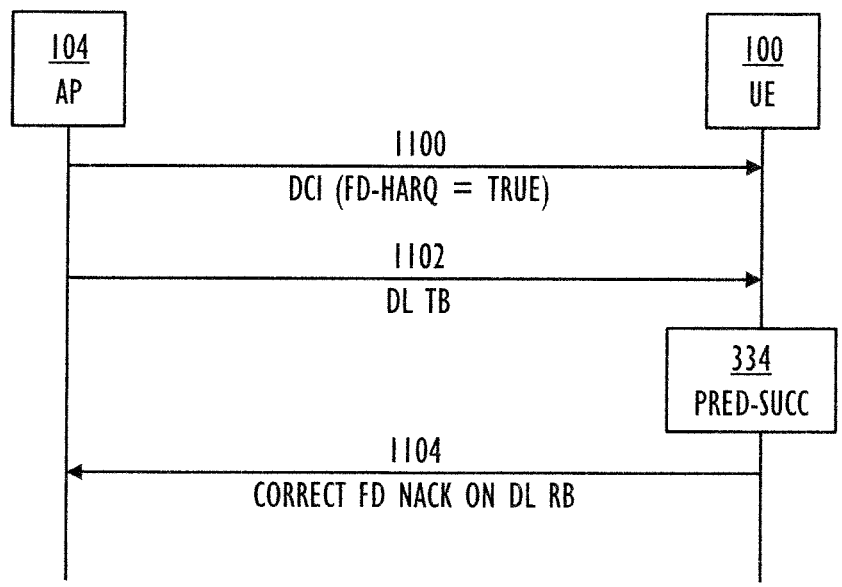
FIG. 11 and FIG. 12 are signal sequence charts illustrating embodiments of HARQ procedure with full-duplex inband signaling.
Figure 12:
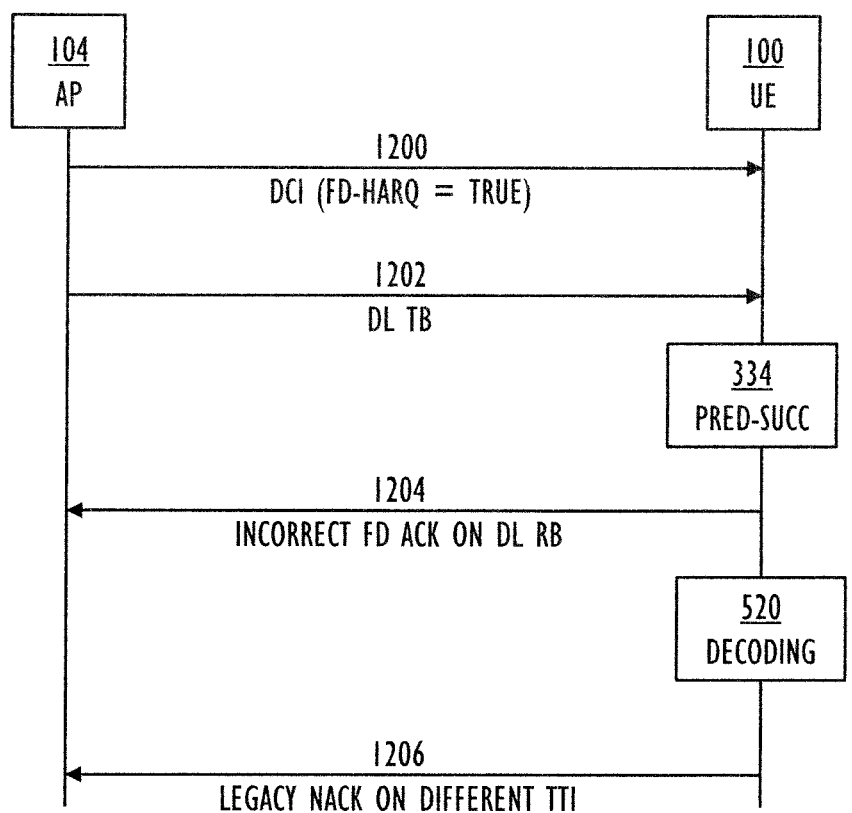

FIG. 11 and FIG. 12 illustrate two embodiments of a hybrid automatic repeat request procedure 342 with the full-duplex inband signaling 322.

In 1100, DCI with FD-HARQ=True is transmitted.

In 1102, a downlink transport block is transmitted from the base station 104 to the user apparatus 100.

The user apparatus 100 predicts 334 correctly that the data packet cannot be decoded and transmits 1104 a (correct) NACK with the full-duplex inband signaling 322.

In 1200, DCI with FD-HARQ=True is transmitted.

In 1202, a downlink transport block is transmitted from the base station 104 to the user apparatus 100.

The user apparatus 100 predicts 334 incorrectly that the data packet can be decoded, transmits 1204 an (incorrect) ACK with the full-duplex inband signaling 322, and, after the decoding 520, transmits a (correct) NACK using the legacy HARQ.

Figure 15:
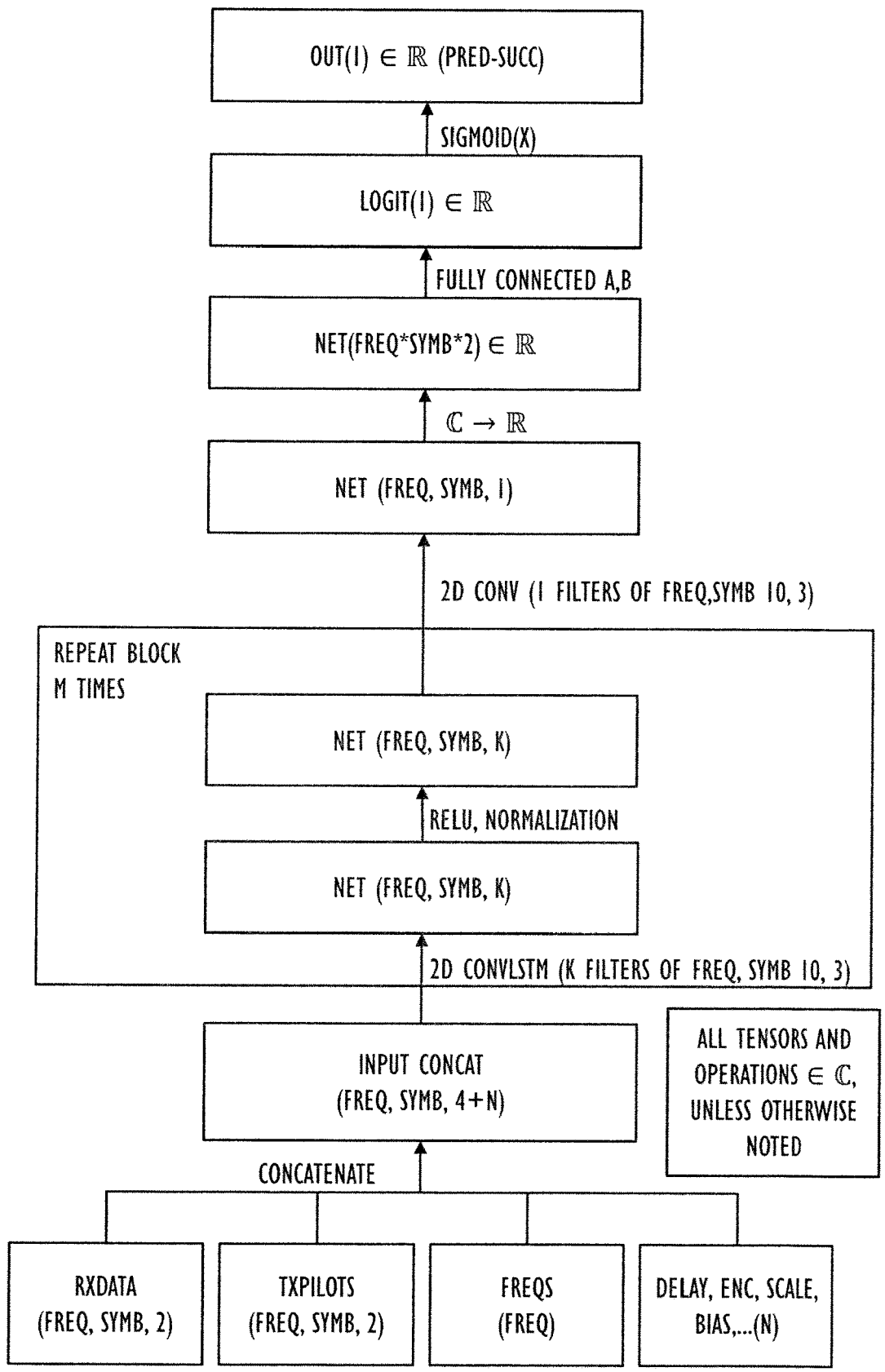
FIG. 15 illustrates an embodiment of a recurrent complex-valued convolutional network.

FIG. 15 illustrates an embodiment of a recurrent complex-valued convolutional network for predicting the decoding success. In this embodiment, the network utilizes 512 subcarriers (or less), but in real life, this number may be easily increased. For demonstrational purposes, the TTI is defined to include 14 symbols, out of which 2 or less are pilots. The pilots may be distributed in any manner in the data. In this embodiment, the receiver has 2 antennas and 3 different encoding schemes (QPSK, 16 QAM, 64 QAM) are considered. Next, the inputs, architecture and outputs of the example network are explained.

INPUTS OF THE NETWORK: the previous frame at $t_{-1}$ and the first $\Delta T$ of the current frame at $t_0$ are concatenated. This time frame is called $\Delta T_{input}$. For simplicity, all inputs span $\Delta T_{input}$, while the output prediction is for the frame at $t_0$. Input data is normalized and the actual scale and bias (1 real and 1 complex value) are given as additional input to the network.

RXDATA: Input data after a Fourier transform (usually Fast Fourier Transform, FFT), including potential pilot symbols. Fill with 0 for those frequencies that are not used. Complex (freqs, symbols, antennas) (512, 14, 2)

TXPILOTS: the known ground truth values and locations of the pilots, otherwise 0. Complex (freqs, symbols, antennas) (512, 14, 1)

FREQUENCIES: Actual frequencies used (512,)

DELAY: between the previous frame $t_{-1}$ and this one $t_0$. Real (1)

ENCODING: one-hot encoded value defining the encoding used (e.g., QPSK, 16 QAM, 64 QAM). Bool (num_encodings) (3)

SCALE, BIAS: (1 real and 1 complex value), before normalization

Network Structure:

For this presentation, the H,W,C (height, width, channels) ordering of the dimensions are used, and all convolutions scan over for the H,W dimensions. H corresponds to frequencies and HW corresponds to symbols in time. For this text and FIG. 15, we leave out the batch dimension, which is prepended, e.g, as the first dimension during training.

Broadcast Encoding (N=3), Scale (N=1) and Bias (N=1), Frequencies (512,) so that their dimensions match TxPilots: 512, 14, N. Convert to Complex.

Concatenate RxData, TxPilots, Delay, Frequencies, Encoding, Scale, Bias along the last dimension: Complex (freqs, symbols, 10) (512, 14, 10).

Repeat M times (the output of the previous repetition is connected to the input of the next repetition, each convolutional layer with their own weight matrices):

Complex valued convolutional layers with, e.g. filter size of 5 frequencies, 5 symbols, and K channels, resulting in a filter weight matrix $W_m$. Use complex ConvLSTM instead, if recurrence is used Complex Relu (Complex Rectified Linear Unit).

Complex Layer, Batch or Group normalization (with potentially trainable weight matrices for bias and scale according to the literature).

Complex valued convolutional layer with filter size of 10 frequencies, 3 symbols, and 1 channels.

After previous step the network dimension is (512, 14, 1).

Concatenate the real and imaginary parts of the network into a real valued tensor: (512, 14, 2).

Flatten (vectorize) into 1-dimensional vector (512*14*K*2).

2 fully connected layers with weights $W_{fc0}$, $W_{fc1}$ (+Relu+ normalization in between them), with the last one having just one output 0 . . . 1 (with sigmoid) (the probability of encoding success).

Further information regarding the network structure (for example the CRelu and the normalization) may be obtained from Trabelsi, et al, Deep Complex Networks, https://arxiv.org/abs/1705.09792, incorporated herein by reference in those jurisdictions where applicable.

Output of the Network:

Single output value (the probability of encoding success).

Operation of the Network:

Input all values defined in the input data and output the probability of encoding success. If the recurrent version is used, then the state of the RNN (Recurrent Neural Network) is reset if the frequency allocation changes.

Training of the Network:

The data for training of this network may be collected by recording normal operational data from receivers. The labels (ground truth) for the data may be obtained by applying normal Turbo encoder as in legacy HARQ and retrieving the final success/fail status (for the whole TTI at time $t_0$). Training of the model is done by optimizing the loss function (e.g. binary cross-entropy loss) using an optimization algorithm such as stochastic gradient descent. If the recurrent version is used, then RNN training sequences are created from those sequences, where the frequency allocation remains unchanged.

In another embodiment, for example for computational reasons, it is possible to change the architecture of the recurrent network so that it does not have any recurrence. In this case, all convLSTM operations are replaced with non-recurrent convolutions.

It is also possible to create a real valued neural network by concatenating the real and imaginary parts of the inputs into a real valued array.

Instead of convolutions, fully connected layers may be used in the network, for example.

Downsampling may be applied after or before the convolutions, with a strided convolution or pooling, for example. Dilated convolutions may also be used for this effect as is known from the related work.

The data may be downsampled before inputting it to the network.

Several models may be trained with different hyperparameters and one may be chosen for use based on current radio conditions.

A deep learning model with attention instead or in addition to LSTM may be used.

For a single carrier waveform, e.g., SC-FDMA: The network may contain a layer that multiplies the input with a predefined FFT rotation matrix and/or a layer that performs IFFT.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

What is claimed is:

1. An apparatus for a network element, comprising:
one or more memories including computer program code; and
one or more processors to execute the computer program code to cause the apparatus to perform at least the following:
analyzing a beginning part of a data packet received on a specific frequency band and in a scheduled slot between a user apparatus and a radio access network to predict a success of decoding the data packet after received in full, wherein the analyzing to predict the success is carried out with a neural network with trained parameters;
controlling a hybrid automatic repeat request procedure associated with the data packet based on the predicted success using the specific frequency band and the scheduled slot for full-duplex inband signaling;
deciding that the user apparatus possesses a capability to receive the full-duplex inband signaling of the hybrid automatic repeat request procedure, if the user apparatus is recorded of having received the full-duplex inband signaling of the hybrid automatic repeat request procedure in the past, or if the user apparatus is missing from a list of user apparatuses being incapable to receive the full-duplex inband signaling of the hybrid automatic repeat request procedure, or if the user apparatus has not yet failed to receive the full-duplex inband signaling of the hybrid automatic repeat request procedure for at least a predetermined number of times; and
transmitting downlink control information indicating that the user apparatus possesses the capability.

2. The apparatus of claim 1, wherein the apparatus is caused to perform the following:
controlling the hybrid automatic repeat request procedure associated with the data packet during a transmission time interval of the data packet.

3. The apparatus of claim 1, wherein the apparatus is caused to perform the following:
controlling the hybrid automatic repeat request procedure associated with the data packet before the data packet is received in full and decoded.

4. The apparatus of claim 1, wherein controlling the hybrid automatic repeat request procedure associated with the data packet comprises:
transmitting an acknowledgement associated with the data packet using the specific frequency band and the scheduled slot for the full-duplex inband signaling, if the predicted success indicates that the decoding of the data packet will succeed; or
transmitting a negative acknowledgement associated with the data packet using the specific frequency band and the scheduled slot for the full-duplex inband signaling, if the predicted success indicates that the decoding of the data packet will fail.

5. The apparatus of claim 1, wherein controlling the hybrid automatic repeat request procedure associated with the data packet comprises:
transmitting a grant for retransmission associated with the data packet using the specific frequency band and the scheduled slot for the full-duplex inband signaling, if the predicted success indicates that the decoding of the data packet will fail.

6. The apparatus of claim 1, wherein the apparatus is caused to perform the following:
transmitting downlink control information indicating a capability of the radio access network to receive the full-duplex inband signaling of the hybrid automatic repeat request procedure, if the radio access network possesses the capability to receive the full-duplex inband signaling, or else controlling the hybrid automatic repeat request procedure to use a legacy hybrid automatic repeat request procedure in uplink; and/or transmitting uplink control information indicating a capability of the user apparatus to receive the full-duplex inband signaling of the hybrid automatic repeat request procedure, if the user apparatus possesses the capability to use the full-duplex inband signaling, or else controlling the hybrid automatic repeat request procedure to use a legacy hybrid automatic repeat request procedure in the downlink.

7. The apparatus of claim 1, wherein the apparatus is caused to perform the following:

transmitting downlink control information indicating a capability of the radio access network to receive the full-duplex inband signaling of the hybrid automatic repeat request procedure, if the radio access network possesses the capability to receive the full-duplex inband signaling, or else controlling the hybrid automatic repeat request procedure to use a legacy hybrid automatic repeat request procedure in uplink; and/or transmitting uplink control information indicating a capability of the user apparatus to receive the full-duplex inband signaling of the hybrid automatic repeat request procedure, if the user apparatus possesses the capability to use the full-duplex inband signaling, or else controlling the hybrid automatic repeat request procedure to use a legacy hybrid automatic repeat request procedure in the downlink;

maintaining statistics indicating a proportion of full-duplex inband signaling capable network elements, and a proportion of correct predictions; and reserving resources for the legacy hybrid automatic repeat request procedure based on the statistics.

8. The apparatus of claim 1, wherein the apparatus is caused to perform the following:

receiving the data packet in full;

decoding the data packet after received in full;

if the predicted success was erroneous, reverting to a legacy hybrid automatic repeat request procedure.

9. The apparatus of claim 1, wherein the network element is the user apparatus.

10. The apparatus of claim 1, wherein the network element belongs to the radio access network.

11. A method comprising:

analyzing a beginning part of a data packet received on a specific frequency band and in a scheduled slot between a user apparatus and a radio access network to predict a success of decoding the data packet after received in full, wherein the analyzing to predict the success is carried out with a neural network with trained parameters;

controlling a hybrid automatic repeat request procedure associated with the data packet based on the predicted success using the specific frequency band and the scheduled slot for full-duplex inband signaling;

deciding that the user apparatus possesses a capability to receive the full-duplex inband signaling of the hybrid automatic repeat request procedure, if the user apparatus is recorded of having received the full-duplex inband signaling of the hybrid automatic repeat request procedure in the past, or if the user apparatus is missing from a list of user apparatuses being incapable to receive the full-duplex inband signaling of the hybrid automatic repeat request procedure, or if the user apparatus has not yet failed to receive the full-duplex inband signaling of the hybrid automatic repeat request procedure for at least a predetermined number of times; and transmitting downlink control information indicating that the user apparatus possesses the capability.

12. The method of claim 11, comprising:

controlling the hybrid automatic repeat request procedure associated with the data packet during a transmission time interval of the data packet.

13. The method of claim 11, comprising:

controlling the hybrid automatic repeat request procedure associated with the data packet before the data packet is received in full and decoded.

14. The method of claim 11, wherein controlling the hybrid automatic repeat request procedure associated with the data packet comprises:

transmitting an acknowledgement associated with the data packet using the specific frequency band and the scheduled slot for the full-duplex inband signaling, if the predicted success indicates that the decoding of the data packet will succeed; or transmitting a negative acknowledgement associated with the data packet using the specific frequency band and the scheduled slot for the full-duplex inband signaling, if the predicted success indicates that the decoding of the data packet will fail.

15. The method of claim 11, wherein controlling the hybrid automatic repeat request procedure associated with the data packet comprises:

transmitting a grant for retransmission associated with the data packet using the specific frequency band and the scheduled slot for the full-duplex inband signaling, if the predicted success indicates that the decoding of the data packet will fail.

16. The method of claim 11, comprising:

receiving the data packet in full;

decoding the data packet after received in full;

if the predicted success was erroneous, reverting to a legacy hybrid automatic repeat request procedure.

* * * * *